(12) United States Patent
Haga et al.

(10) Patent No.: US 10,615,656 B2
(45) Date of Patent: Apr. 7, 2020

(54) BUS BAR STRUCTURE FOR A MOTOR

(71) Applicant: Nidec Corporation, Kyoto (JP)

(72) Inventors: Hidehiro Haga, Kyoto (JP); Yu Asahi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 265 days.

(21) Appl. No.: 14/951,740

(22) Filed: Nov. 25, 2015

(65) Prior Publication Data
US 2016/0149454 A1    May 26, 2016

(30) Foreign Application Priority Data

Nov. 25, 2014 (JP) .................................. 2014-237927

(51) Int. Cl.
*H02K 3/28* (2006.01)
*H02K 3/52* (2006.01)
*H02K 5/22* (2006.01)

(52) U.S. Cl.
CPC .............. *H02K 3/28* (2013.01); *H02K 3/522* (2013.01); *H02K 5/225* (2013.01); *H02K 2203/09* (2013.01)

(58) Field of Classification Search
CPC ....... H02K 3/28; H02K 3/522; H02K 2203/09
USPC .......................................... 310/71, 179–208
See application file for complete search history.

(56) References Cited

U.S. PATENT DOCUMENTS

| 6,600,244 B2 | 7/2003 | Okazaki et al. |
| 6,914,356 B2 | 7/2005 | Yamamura et al. |
| 7,135,799 B2 | 11/2006 | Rittmeyer |
| 7,152,301 B2 | 12/2006 | Rittmeyer |
| 7,692,341 B2 * | 4/2010 | Lafontaine ............... H02K 3/50 310/58 |
| 7,806,225 B2 | 10/2010 | Itoh |
| 8,519,583 B2 | 8/2013 | Sakaue et al. |
| 8,552,604 B2 * | 10/2013 | Matsuda .............. B62D 5/0406 310/43 |

(Continued)

FOREIGN PATENT DOCUMENTS

| EP | 1 344 296 B1 | 7/2008 |
| JP | 2002-199638 A | 7/2002 |

(Continued)

OTHER PUBLICATIONS

English translation of JP2013223297; Oct. 2013.*

*Primary Examiner* — Alfonso Perez Borroto
*Assistant Examiner* — Ahmed Elnakib
(74) *Attorney, Agent, or Firm* — Keating & Bennett

(57) ABSTRACT

A motor comprising: a stator including a plurality of coils, and a rotary axis penetrating the stator, the stator includes n (n≥2) sets of three-phase circuits, each of which is provided with three phases, each phase of the three-phase circuit has a coil group in which m (m≥2) coils are formed with a single conductive wire, and all coil groups of three-phase circuits have the same winding direction, the three-phase circuits include neutral point bus bars connecting each coil terminal on one side of each of the coil group at a neutral point, and three phase bus bars connecting each coil terminal on one side of each of the coil group, the three phase bus bars are arranged in a circumferential direction and form a phase bus bar group, and the phase bus bar group and the neutral point bus bars are alternately arranged in the circumferential direction.

14 Claims, 11 Drawing Sheets

(56) References Cited

U.S. PATENT DOCUMENTS

| | | | |
|---|---|---|---|
| 8,674,578 B2 | 3/2014 | Aono et al. | |
| 9,118,231 B2 | 8/2015 | Matsubara et al. | |
| 2003/0011268 A1* | 1/2003 | Even | H02K 3/12 |
| | | | 310/179 |
| 2005/0029892 A1 | 2/2005 | Ariyoshi et al. | |
| 2005/0242677 A1 | 11/2005 | Akutsu et al. | |
| 2005/0248229 A1* | 11/2005 | Even | H02K 3/12 |
| | | | 310/180 |
| 2008/0157610 A1 | 7/2008 | Watanabe et al. | |
| 2009/0026859 A1* | 1/2009 | Kinoshita | H02K 3/522 |
| | | | 310/71 |
| 2010/0181851 A1* | 7/2010 | Shinkawa | H02K 3/28 |
| | | | 310/71 |
| 2011/0285226 A1* | 11/2011 | Fujita | H01L 23/49562 |
| | | | 310/71 |
| 2011/0297474 A1* | 12/2011 | Aono | B62D 5/0403 |
| | | | 180/443 |
| 2011/0309700 A1 | 12/2011 | Jang et al. | |
| 2012/0169163 A1* | 7/2012 | Imai | H02K 1/2746 |
| | | | 310/71 |
| 2013/0200742 A1 | 8/2013 | Seki et al. | |
| 2016/0149454 A1* | 5/2016 | Haga | H02K 3/28 |
| | | | 310/71 |
| 2016/0190887 A1* | 6/2016 | Sambuichi | H02K 3/522 |
| 2017/0133905 A1* | 5/2017 | Nakamura | H02K 3/522 |
| 2017/0237377 A1* | 8/2017 | Furukawa | H02P 29/00 |
| | | | 318/564 |
| 2019/0016371 A1* | 1/2019 | Urimoto | H02K 3/50 |

FOREIGN PATENT DOCUMENTS

| | | |
|---|---|---|
| JP | 2005-237068 A | 9/2005 |
| JP | 2006-296146 A | 10/2006 |
| JP | 2013-223297 A | 10/2013 |
| JP | 2013223297 | * 10/2013 |
| WO | WO 2014061276 | * 4/2014 |

* cited by examiner

BUS BAR STRUCTURE FOR A MOTOR

BACKGROUND OF THE INVENTION

1. Field of the Invention

The present disclosure relates to a motor.

2. Description of the Related Art

An inner rotor type brushless motor has an outer stator, which is a stator formed of a plurality of coils, and an inner rotor, which is a rotor having magnets disposed on the outer circumference thereof. The coils of the stator are divided into three-phase coils, which include U-phase, V-phase and W-phase, and form a three-phase circuit.

However, in order to manufacture a pair of coils in which the coils start winding from two different sides, different process for the different type had to be performed, and thereby the manufacturing process became complicated.

SUMMARY OF THE INVENTION

A first exemplary embodiment of the present disclosure is a motor which comprises a stator provided with a plurality of coils arranged in an annular shape, and a rotary axis which penetrates through the stator. The stator has n (n≥2) sets of three-phase circuits with three phases. Each phase of the three-phase circuit is provided with a coil group which is formed of m (m≥2) coils connected into a single conductive wire. In each coil group of each set of the three-phase circuits, coil is wound in the same direction. Each of the three-phase circuits comprises a neutral bus bar which connects one terminal ends of the coils of each coil group as a neutral point, and three phase bus bars which connect the other terminal ends of the coils of each coil group. Three phase bus bars in the same set of three-phase circuit are arranged in the circumferential direction, and form a phase bus bar group. The phase bus bar group and the neutral bus bar are alternately arranged in the circumferential direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
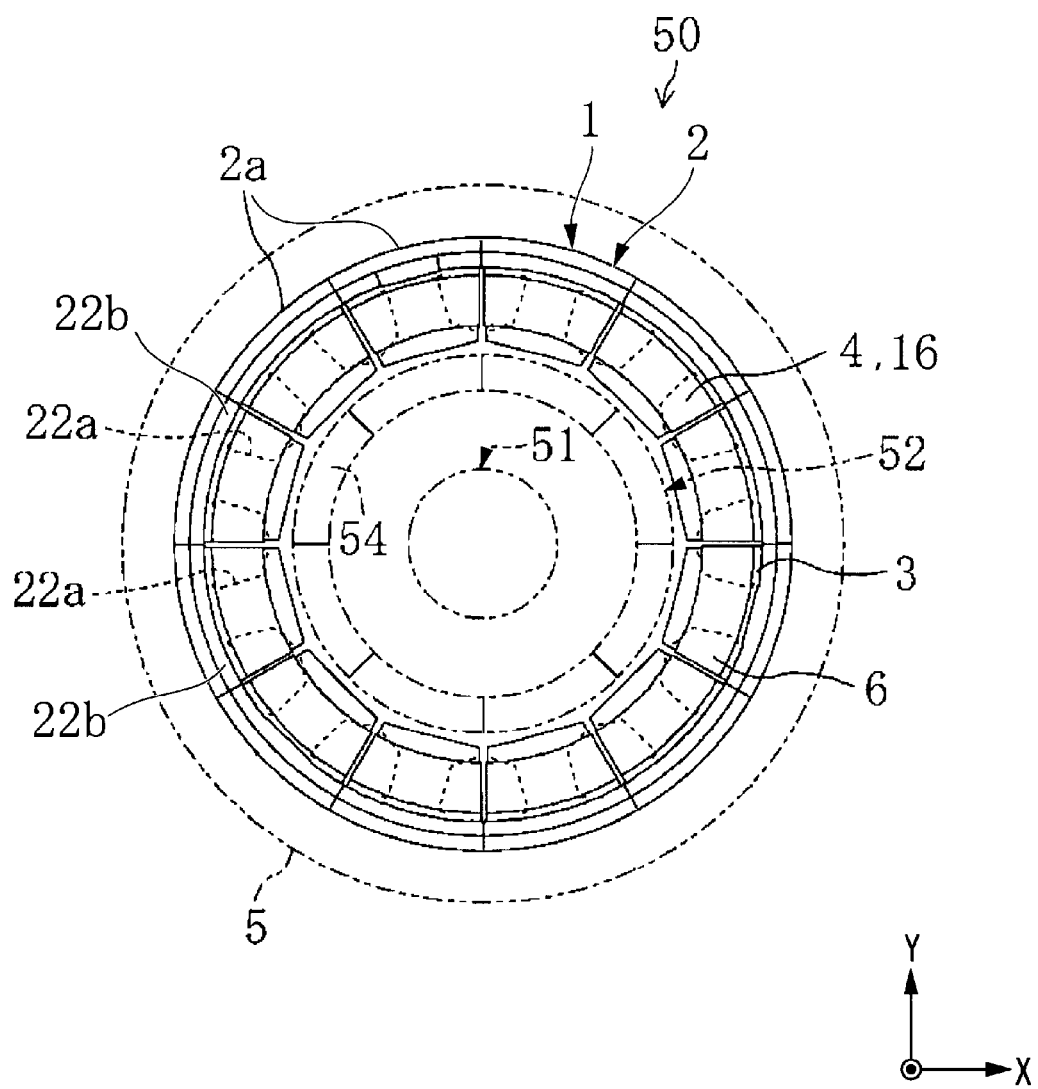
FIG. 1 is a schematic view which illustrates the structure of a motor according to a first preferred embodiment.

Herein, a preferred embodiment will be explained with reference to the accompanying drawings. In this description, a circumferential direction having its center on a center axis of the motor is simply referred to as "circumferential direction", and a radial direction having its center on the center axis is simply referred to as "radial direction". In the drawings, X-axis, Y-axis and Z-axis will be shown as necessary. It should be noted that the positional direction of the motor defined in this description is not intended to limit the vertical direction when the motor according to the present disclosure is actually mounted on equipment.

FIG. 1 is a schematic cross-sectional view of a motor 50 according to a preferred embodiment of the present disclosure. The motor 50 is an inner rotor type motor. In this preferred embodiment, the motor 50 has eight magnetic poles and twelve slots. The motor 50 preferably has a housing 5, a stator 1, a rotary axis 51 which penetrates through the stator 1, and a rotor 52. The stator 1 has a plurality of coils 4 arranged into an annular shape.

The housing 5 has a cylindrical or substantially cylindrical shape, and surrounds the stator 1. The stator 1 has a cylindrical or substantially cylindrical shape. The rotor 52 is arranged inside the stator 1. The rotor 52 has a cylindrical or substantially cylindrical shape. An outer surface of the rotor 52 faces an inner circumferential surface of the stator 1 with a gap therebetween. The rotor 52 is fixed around the rotary axis 51. The rotary axis 51 is rotatably supported by the housing 5. Eight magnets 54 are provided on an outer circumference of the rotor 52. The N-poles and the S-poles of these magnets 54 are alternately arranged in the circumferential direction at equal intervals. Further, the magnets 54 maybe embedded in the rotor 52. The magnets 54 may have an annular shape.

The stator 1 preferably has a core 2 which includes a plurality of element cores 2a, an insulator 3 which is provided to each of the element cores 2a, and a conductive wire 16. In this preferred embodiment, the number of element cores 2a is twelve. Each of the element cores 5a is connected to one another and constitutes the core 2. The coils 4 are formed by winding up the conductive wire 16.

Figure 2:
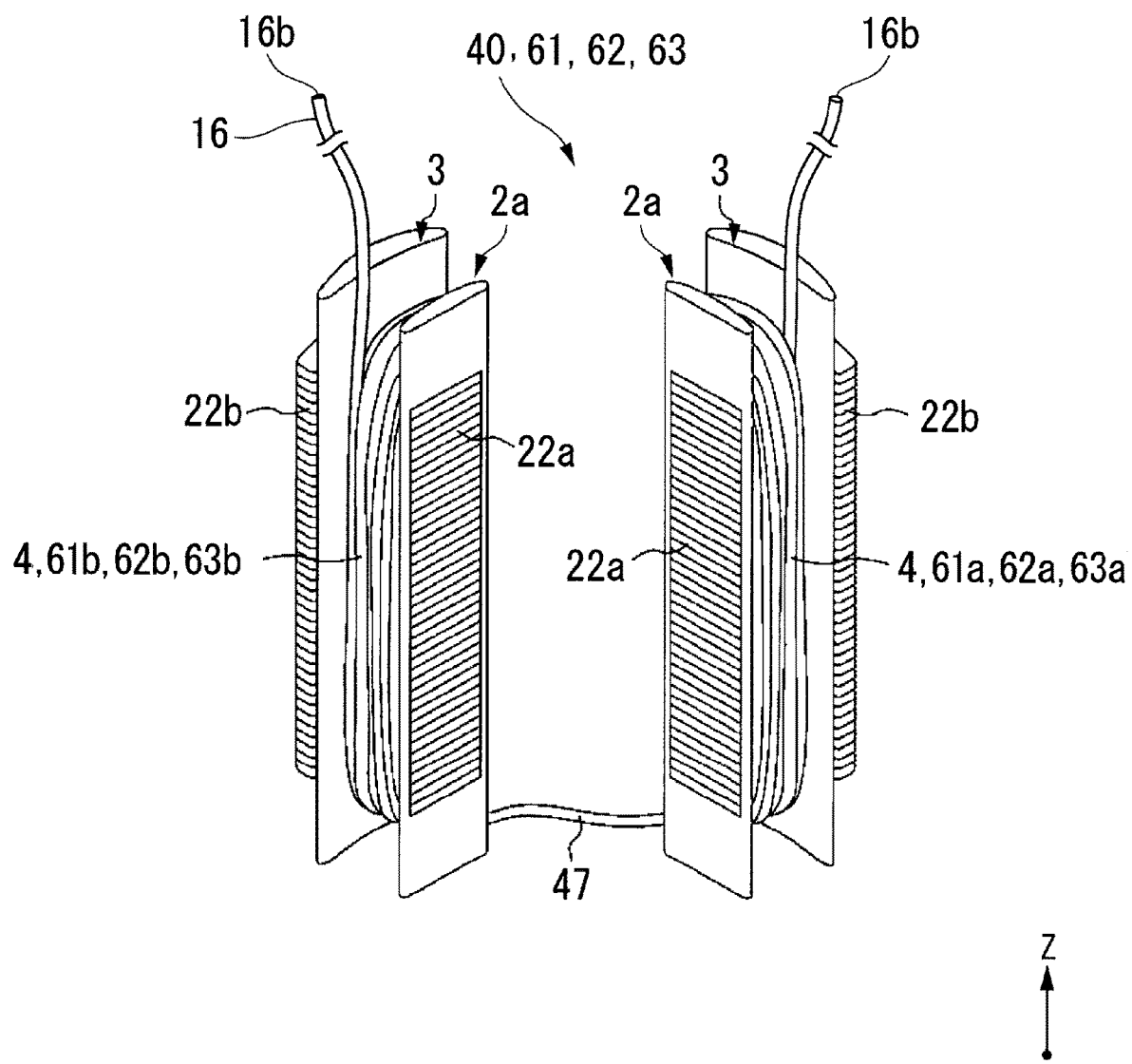
FIG. 2 is a perspective view of a coil group according to the first preferred embodiment.

As shown in FIG. 2, the element cores 2a extend in the axial direction (Z-axis direction). The cross section perpendicular to the axial direction (Z-axis direction) of the element cores 2a has a T shape or substantially T shape. The element cores 2a have a core yoke 22b, and an element teeth portion 22a. The core yoke 22b connects the neighboring element cores 2a. The element teeth portion 22a protrudes from the core yoke 22b toward the center of the stator 1. The conductive wire 16 is wound around between the element teeth portion 22a and the insulator 3 which has insulating property. The wound up conductive wire 16 constitutes the coils 4. In the stator 1, the plurality of element cores 2a are arranged in an annular or substantially annular shape. Accordingly, in the stator 1, the same number of coils corresponding to the number of the element cores 2a is arranged in an annular shape. That is, in this preferred embodiment, twelve coils 4 are arranged in an annular shape.

Every two of the plurality of coils 4 are grouped into a coil group 40. Since there are twelve coils 4 in this preferred embodiment, the stator 1 has six coil groups 40. The two coils 4 of the same coil group 40 are continuously formed by a single conductive wire 16. The two coils 4 of the same coil group 40 are continuously connected to each other by a connection wire 47 which is a portion of the conductive wire 16.

Figure 3:
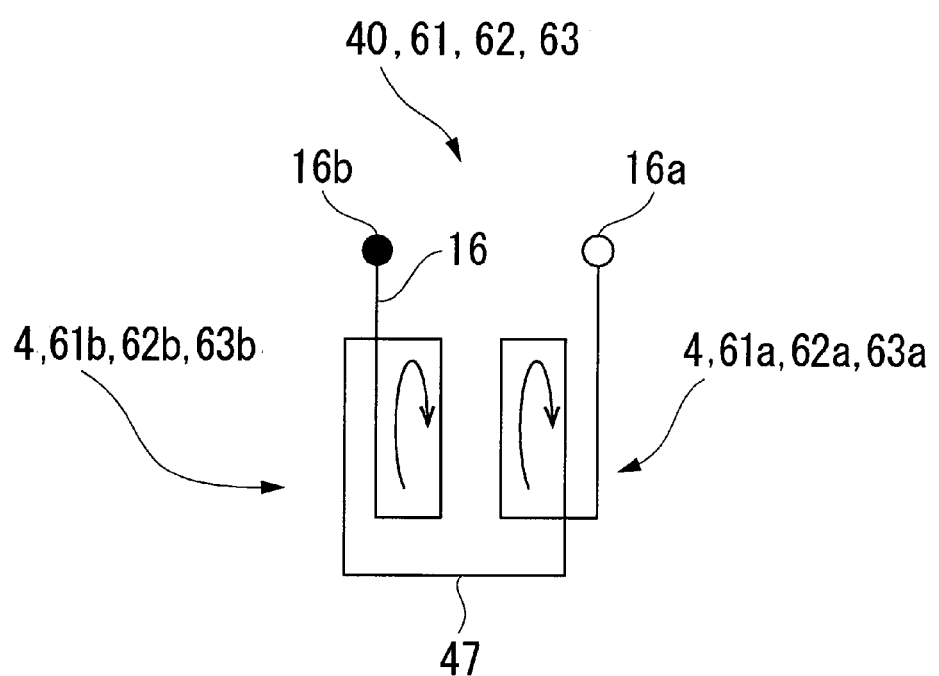
FIG. 3 is a mimetic illustration of a winding direction and a winding order direction of the coil group according to the first preferred embodiment.

FIG. 3 is a mimetic illustration of a winding direction and a winding order direction of the conductive wire 16 in the coil group 40. In FIG. 3, the winding direction and the winding order direction are shown in a view taken in the radial direction from the center of the stator 1. In this description, the winding direction refers to the circumferential direction in which the conductive wire 16 is wound around each of the coils 4. There are two types of winding directions, that is, a clockwise winding direction and a counterclockwise winding direction. In this description, the winding order direction refers to the order (direction) of coils 4 in the coil group 40 in which the winding of conductive wire 16 is progressed. There are two types of winding order directions, that is, a winding order direction in which winding begins with the coil 4 on the right side of the stator 1 and ends with the coil 4 on the left side (see FIG. 3) and a winding order direction which begins and ends in the opposite order (see FIG. 11).

The winding direction of each of the coils 4 is set in the same direction when seen from the center of the stator 1. Also, in this preferred embodiment, the winding direction of the coils 4 is clockwise; however, it may also be counterclockwise.

Figure 11:
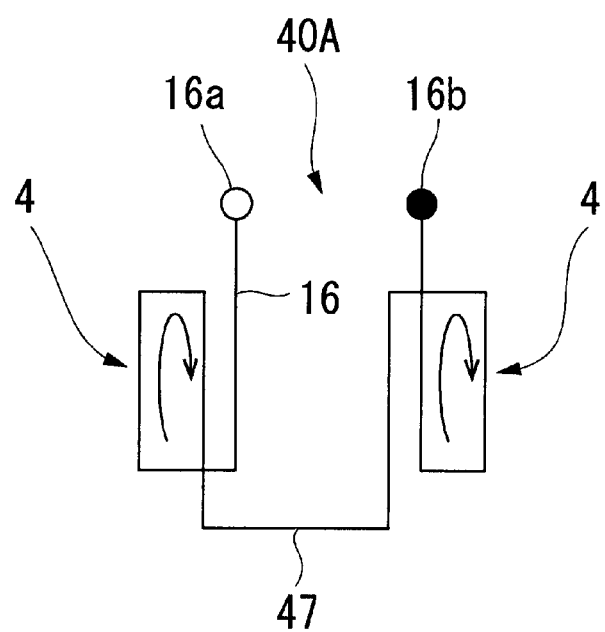
FIG. 11 is a mimetic illustration of a winding direction and a winding order direction of the coil group according to the first preferred embodiment.

The winding order direction of the conductive wire 16 in every coil group 40 of the stator 1 is the same. In FIG. 3, a beginning end 16a, which is an end portion where coiling begins, is disposed to the coil 4 on the right side among the two coils 4 of the coil group 40. A finishing end 16b, which is an end portion where coiling ends, is disposed to the coil 4 on the left side among the two coils 4 of the coil group 40. In place of the coil group 40, a coil group 40A, which is shown in FIG. 11, may be used. In the coil group 40A, the beginning end 16a is disposed to the coil 4 on the left side, and the finishing end 16b is disposed to the coil 4 on the right side, when seen from the center of the stator 1.

Figure 4:
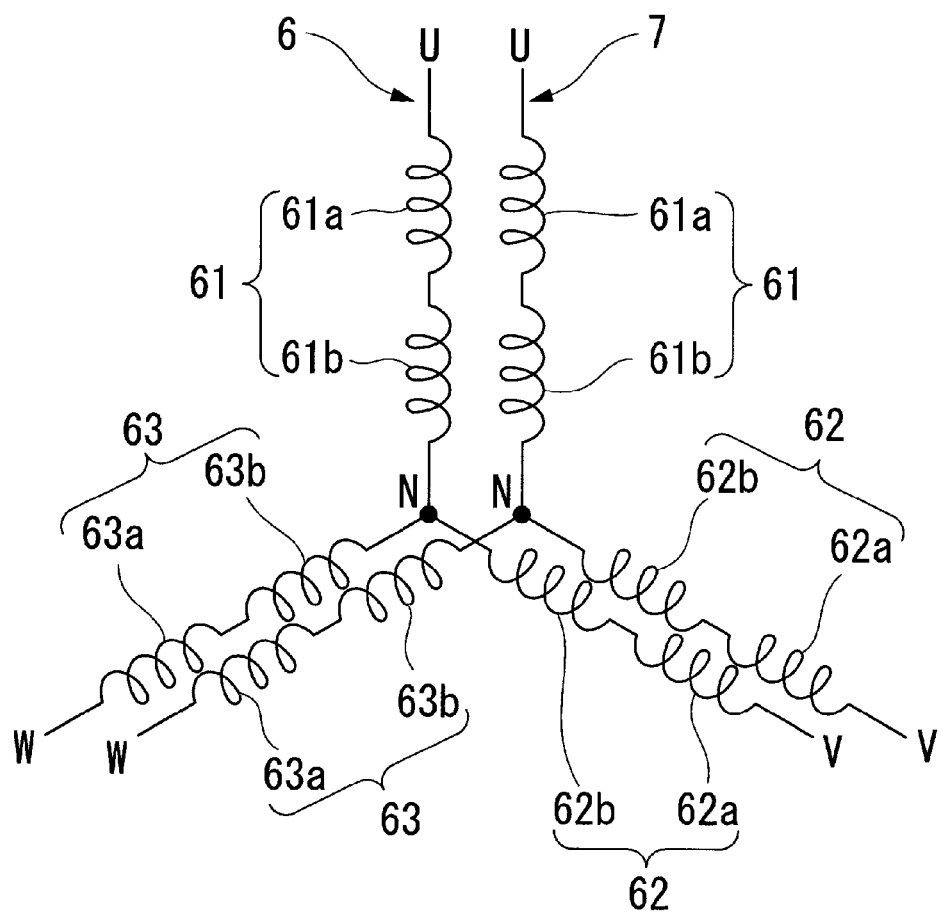
FIG. 4 is a mimetic illustration of three-phase circuits formed of the coils and the coil group according to the first preferred embodiment.

FIG. 4 is a mimetic illustration of three-phase circuits 6, 7 formed of the coils 4 and the coil group 40. Herein, the plurality of coils 4 and the plurality of coil groups 40 will be designated with different reference numbers, and will be separately explained. Coils 61a, 62a, 63a are coils 4 on the beginning end 16a side of FIG. 3. Coils 61b, 62b, 63b are coils 4 on the finishing end 16b side of FIG. 3. Coil groups 61, 62, 63 are the coil groups 40 described above.

As shown in FIG. 4, the stator 1 has two sets of three-phase circuits, that is, a first three-phase circuit 6 and a second three-phase circuit 7, which respectively have three phases. In the stator 1, the U-phase has a coil group 61 in which two coils 61a, 61b are continuously formed of a single conductive wire. In the stator 1, the V-phase has a coil group in which two coils 62a, 62b are continuously formed of a single conductive wire 16. The W-phase has a coil group 63 in which two coils 63a, 63b are continuously formed of a single conductive wire 16.

Figure 6:
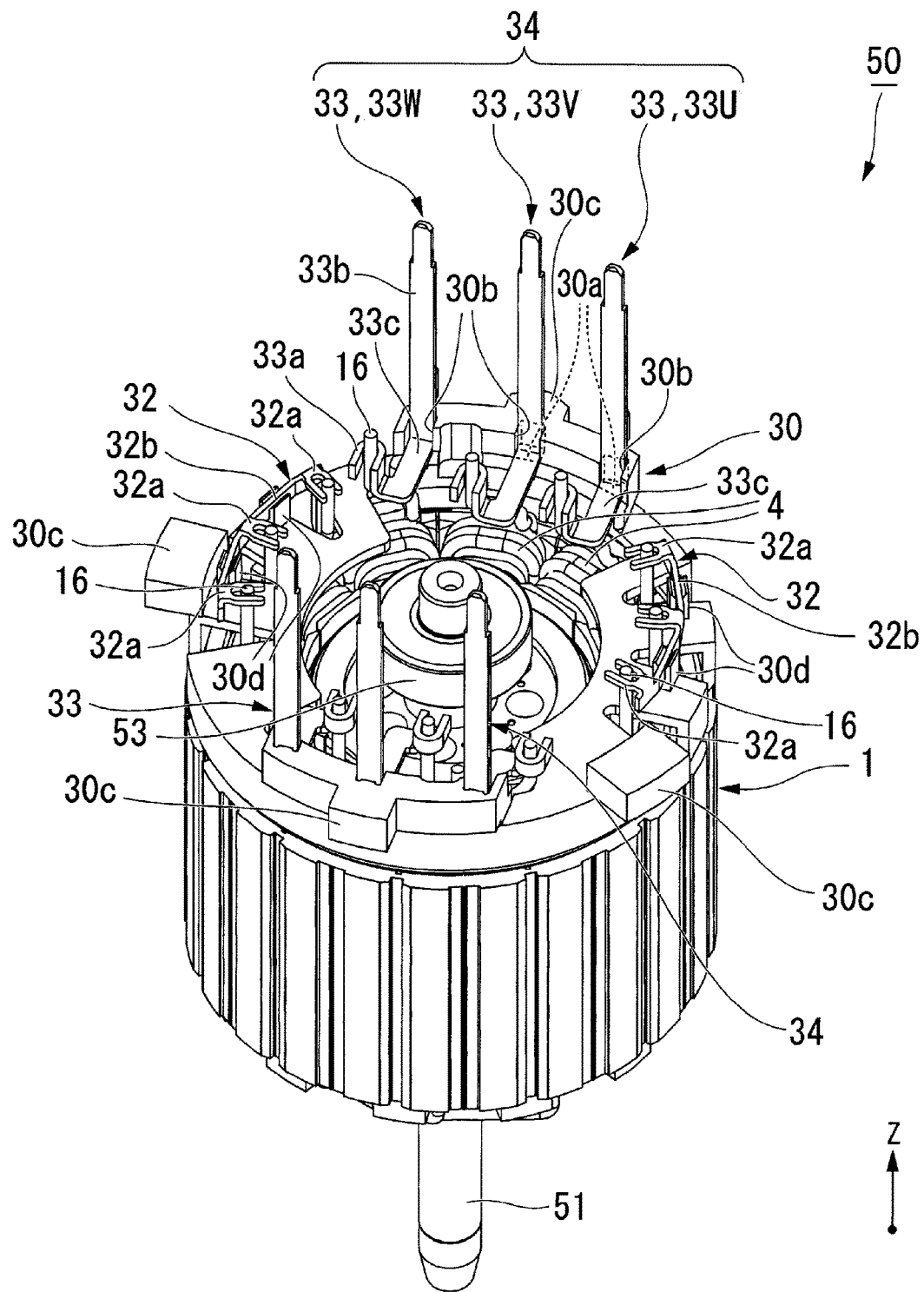
FIG. 6 is a perspective view of the motor according to the first preferred embodiment.

The first three-phase circuit 6 and the second three-phase circuit 7 are respectively independent three-phase circuits, and they are not electrically connected to each other. Each phase of the first three-phase circuit 6 and the second three-phase circuit 7 is respectively connected at a neutral point N. That is, the connection type of the first three-phase circuit 6 and the second three-phase circuit 7 is a so-called star shape wire connection. Terminals which are respectively capable of flowing U-phase, V-phase, and W-phase currents are correspondingly provided to the terminal end of each phase of the first three-phase circuit 6 and the second three-phase circuit 7. For example, a phase bus bar 33 shown in FIG. 6 is provided to the terminal end of each phase of the first three-phase circuit 6 and the second three-phase circuit 7.

In the U-phase coil group 61, the coil 61b is wired on the neutral point N side, and the coil 61a is wired on the terminal side. In the V-phase coil group 62, the coil 62b is wire on the neutral point N side, and the coil 62a is wired on the terminal side. In the W-phase coil group 63, the coil 63b is wired on the neutral point N side, and the coil 63a is wired on the terminal side.

Figure 5:
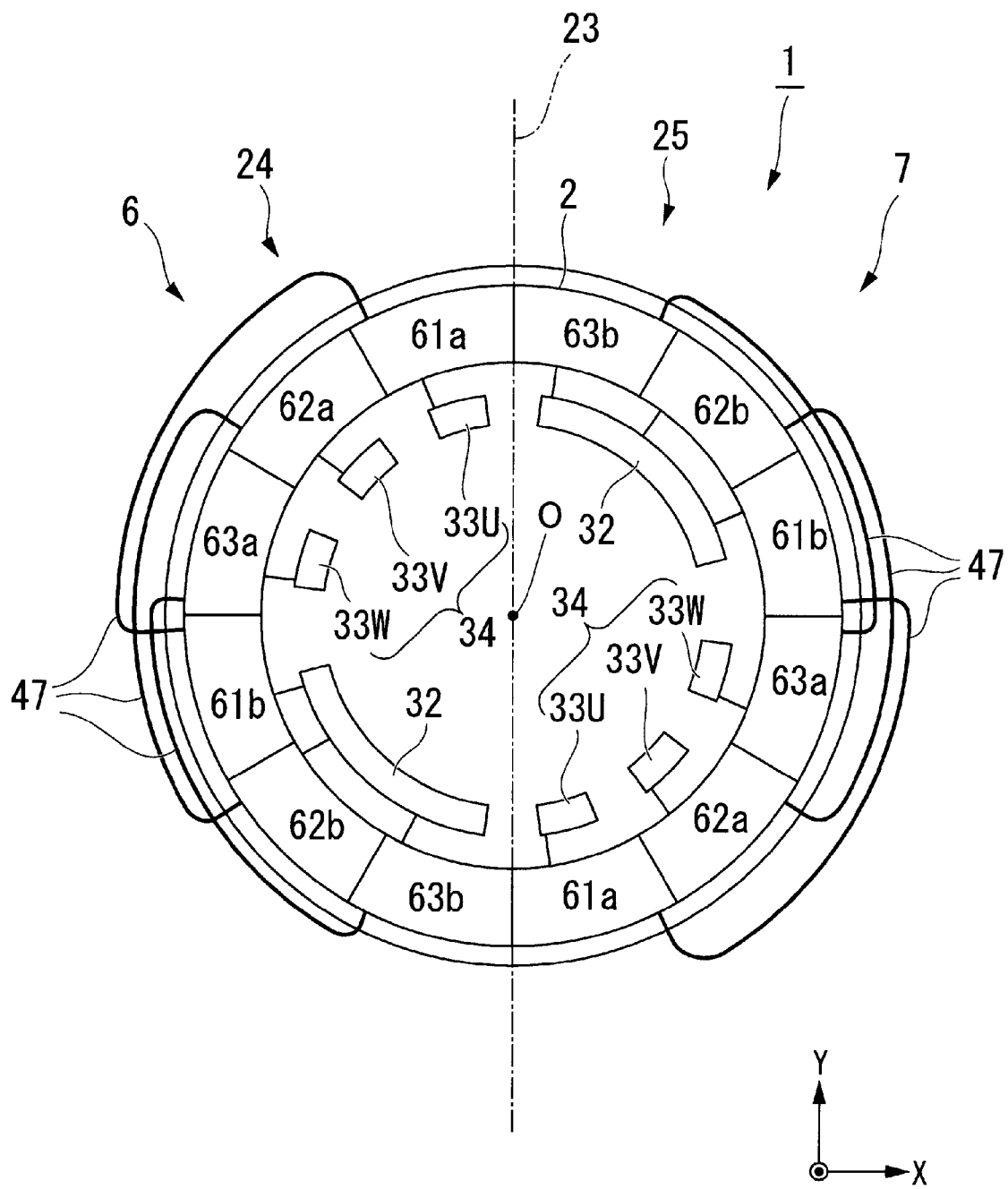
FIG. 5 is a mimetic illustration which views a stator according to the first preferred embodiment in an axial direction.

FIG. 5 is a mimetic illustration which views the stator 1 in the axial direction. Herein, based on FIG. 5, the arrangement of each of the coils 61a, 61b, 62a, 62b, 63a, 63b which form the first three-phase circuit 6 and the second three-phase circuit 7 of the stator 1 will be described. As shown in FIG. 5, the stator 1 is divided into a first area 24 and a second area 25 by a hypothetical bisecting line 23, when the stator 1 is viewed in the axial direction. Here, the first three-phase circuit 6 is disposed in the first area 24, and the second three-phase circuit 7 is disposed in the second area 25. The coils 61a, 61b, 62a, 62b, 63a, 63b of the first three-phase circuit 6 and the coils 61a, 61b, 62a, 62b, 63a, 63b of the second three-phase circuit 7 are rotationally symmetric with respect to the center O of the stator 1. In the first area 24 where the first three-phase circuit 6 is disposed, the coil 61a, the coil 62a, the coil 63a, the coil 61b, the coil 62b and the coil 63b are disposed counterclockwise in a sequential order. In the second area 24 where the second three-phase circuit 7 is disposed, each coil is disposed in the same order as in the first area 24. That is, in the second area 25, the coil 61a, the coil 62a, the coil 63a, the coil 61b, the coil 62b and the coil 63b are disposed counterclockwise in a sequential order.

As mimetically illustrated in FIG. 5, the first three-phase circuit 6 and the second three-phase circuit 7 respectively have a neutral point bus bar 32, and a phase bus bar 33. One neutral point bus bar 32 is provided to the first three-phase circuit 6 and the second three-phase circuit 7, respectively. The neutral point bus bar 32 connects the one terminal ends of the coils 61b, 62b, 63b of each of the coil groups 61, 62, 63 as the neutral point N (see FIG. 4). In each set of the three-phase circuits, the coils 61b, 62b, 63b, which are on the neutral point N side, are disposed alongside one another. The neutral point bus bar 32 is disposed along the aligned coils 61b, 62b, 63b. The neutral point bus bar 32 is connected to the conductive wire 16 which is extended form the coils 61b, 62b, 63b. With this, the connection type of the coil groups 61, 62, 63 becomes a star shape wire connection.

In this preferred embodiment, three phase bus bars 33 are provided, each corresponding to the U-phase, the V-phase and the W-phase of the three-phase circuits 6, 7. The phase bus bars 33 connected to the coil terminals on the other coils 61a, 62a, 63a side in each of the coil groups 61, 62, 63. In the following description, among the phase bus bars 33, the phase bus bar 33 applicable to the U-phase is referred to as a phase bus bar 33U, the phase bus bar 33 applicable to the V-phase is referred to as a phase bus bar 33V, and the phase bus bar 33 applicable to the W-phase is referred to as a phase bus bar 33W. Among the coils of respective phases, the coils 61*a*, 62*a*, 63*a*, which are on the phase bus bar 33 side, are disposed alongside one another. The U-phase phase bus bar 33U is disposed along the U-phase coil 61*a*, and connected to the conductive wire 16 which is extended from the coil 61*a*. The V-phase phase bus bar 33 is disposed along the coil 62*a*, and connected to the conductive wire 16 which is extended from the coil 62*a*. The W-phase coil 63*a* is disposed along the phase bus bar 33W, and connected to the conductive wire 16 which is extended from the coil 63*a*.

The three phase bus bars 33 which belong to the same set of three-phase circuits are aligned in the circumferential direction and form a phase bus bar group 34. The phase bus bar group 34 and the neutral point bus bar 32 are alternately arranged along the circumferential direction. With this arrangement, the area in which the phase bus bar group 34 is disposed and the area in which the neutral point bus bar 32 is disposed are separated, and it is thereby possible to prevent short circuit from occurring between the phase bus bar 33 and the neutral point bus bar 32. Also, the bus bar group 34 and the neutral point bus bar 32 are alternately arranged along the circumferential direction. With this arrangement, the three-phase circuits of the other set are disposed with rotational symmetry. As a result, the winding direction and the winding order direction of not only the coil group 40 included in the same set of three-phase circuits but of all coil groups 40 of all sets of the three-phase circuits are set in the same direction. The coil group 40 having the same winding direction and the same winding order direction can be manufactured in a one-tier process, and it is thereby possible to reduce manufacturing costs.

In the motor 50 of this preferred embodiment, the phase bus bars 33 of the same phase from the two different three-phase circuits (that is, the first three-phase circuit 6 and the second three-phase circuit 7) are arranged in the circumferential direction at every angle obtained by the 360°/n formula. In this formula, n refers to the number of sets of the three-phase circuits, in which n=2 in this embodiment. In this formula, n is a counting number. According to this formula, the two different three-phase circuits are preferably arranged at every 180 degrees in the circumferential direction of the stator 1. Thus, with such arrangement of the phase bus bars of the same phase, the winding direction and the winding order direction of all coil groups 40 are set in the same direction.

In this preferred embodiment, the stator 1 has two sets of three-phase circuits 6, 7 which are independent of each other. With this structure, the stator 1 is provided with a plurality of current pathways, and even if defect occurs in one current pathway, current is able to flow through the other current pathway so that at least the operation of the motor 50 is enabled.

Figure 7:
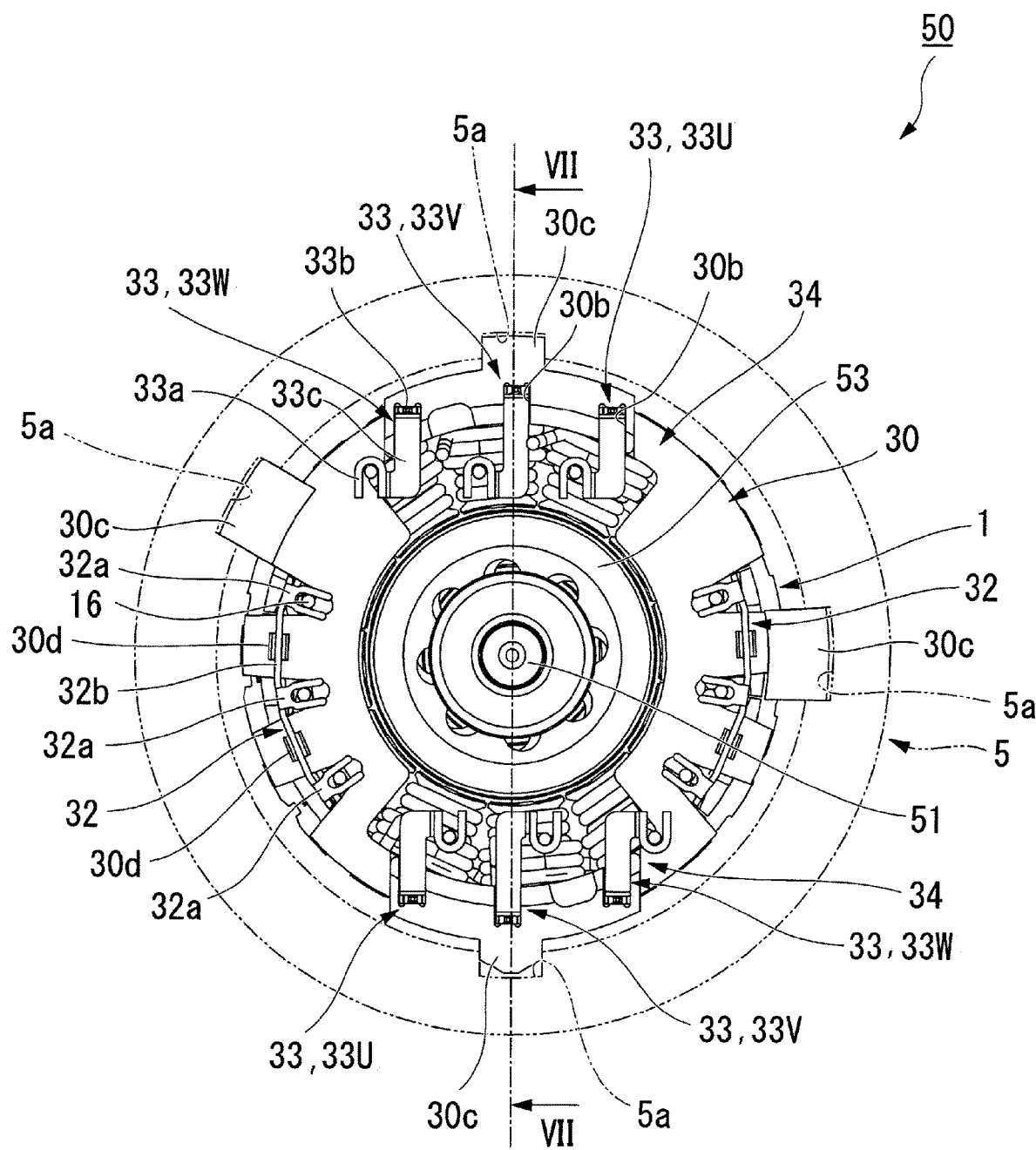
FIG. 7 is a top view of the motor according to the first preferred embodiment.
Figure 8:
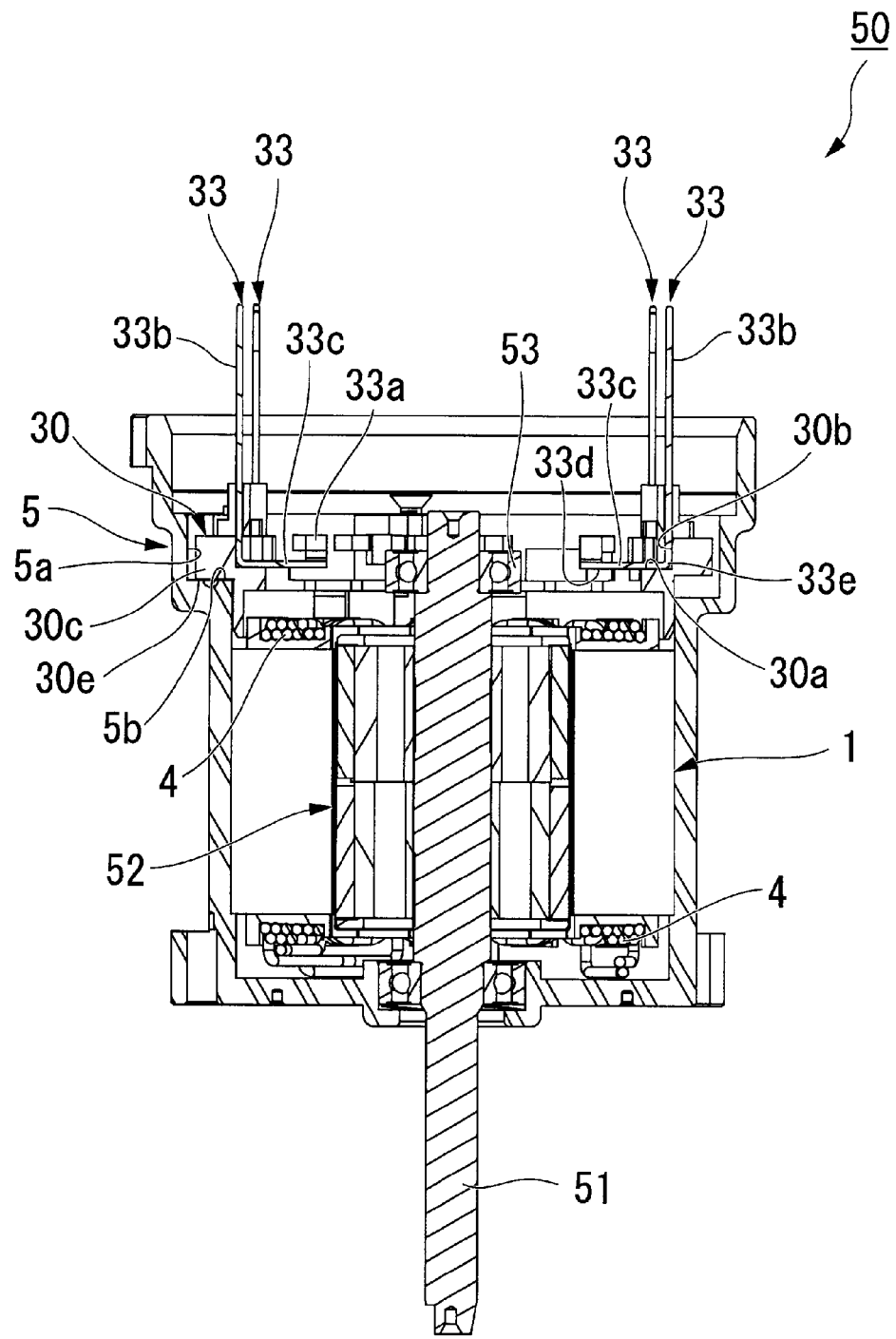
FIG. 8 is a perspective view taken along the VII-VII line of FIG. 7.

FIG. 6 is a perspective view of the motor 50. FIG. 7 is a top view of the motor 50 taken in the axial direction. FIG. 8 is a cross-sectional view taken along the VII-VII line of FIG. 7. In FIG. 6, the housing 5 is not illustrated due to simplification of the drawing. In FIG. 7, the housing 5 is mimetically illustrated with a two point chain line.

As shown in FIG. 6, the motor 50 preferably has the plurality of neutral point bus bars 32, the plurality of phase bus bars 33, and a bus bar holder 30. The number of the neutral point bus bars is two. The number of the phase bus bars 33 is six. The bus bar holder 30 is disposed along one +Z side of the stator 1. The neutral point bus bars 32 and phase bus bars 33 are disposed on an opposite side from the stator 1 across the bus bar holder 30. The neutral point bus bars 32 and the phase bus bars 33 are preferably press-processed articles formed of metal plates having excellent conductivity, such as copper, and the like. The bus bar holder 30 supports the neutral point bus bars 32 and the phase bus bars 33.

The neutral point bus bar 32 is formed by bending a strip of sheet material. The neutral point bus bar 32 has a plurality of connection portions 32*a* which are arranged in the circumferential direction, and relay portions 32*b* to tie up the connection portions 32*a*. In this preferred embodiment, the number of connection portions 32*a* is three. The relay portion 32*b* has a circular arc or substantially circular arc shape which extends in the circumferential direction of the stator 1. Each of the three connection portions 32*a* extends radially inward from the relay portion 32*b*. Each of the connection portions 32*a* is connected to the conductive wire 16 which extends in the axial direction from one end of the coil 4. A front end of the connection portion 32*a* has a U-shape when seen in one axial direction, and the conductive wire 16 is inserted therethrough. By performing welding, and the like, while the conductive wire is inserted through the connection portion 32*a*, the connection portion 32*a* is connected to the conductive wire 16. Three connection portions 32*a* are electrically connected to one another through the relay portion 32*b*.

The phase bus bar 33 preferably has a connection portion 33*a*, a terminal portion 33*b*, and a relay portion 33*c*. The connection portion 33*a* is connected to the conductive wire 16 which extends in the axial direction from one end of the coil 4. The connector portion 33*a* preferably has a U-shape when seen in one axial direction, and the conductive wire 16 is inserted therethrough. By performing welding, and the like, while the conductive wire 16 is inserted through the connection portion 33*a*, the connection portion 33*a* is connected to the conductive wire 16. The relay portion 33*c* extends radially outward within a plane which is orthogonal to the axial direction. The relay portion 33*c* has a rear surface 33*d* (see FIG. 8). The rear surface 33*d* engages a supporting surface 30*a* of the bus bar holder 30. The terminal portion 33*b* is connected to the connection portion 33*a* through the relay portion 33*c*, and extends in the axial direction. The terminal portion 33*b* is a terminal connected to a control unit (not illustrated in the drawings) which supplies an alternating current to the three-phase circuits 6, 7 (see FIG. 4).

The phase bus bar 33 is connected to the beginning end 16*a* where the winding of the conductive wire 16 begins in the coil group 40 (see FIG. 2). When the conductive wire 16 is wound up and formed into the coil 4, the movement of an end portion on the winding beginning side (that is, the beginning end 16*a*) is restricted so that the conductive wire 16 can be wound on the outer circumference in an orderly manner. Since the beginning end 16*a* side is connected to the phase bus bar 33, the movement of the phase bus bar 33 is also restricted. With this, it is possible to prevent the neighboring phase bus bars 33 from contacting each other. Also, the phase bus bar 33 may be connected to the finishing end 16*b* of the conductive wire 16 in the coil group 40. It is relatively difficult to restrict the movement of the finishing end 16*b* when compared to the beginning end 16*a*. Accordingly, when the phase bus bar 33 is connected to the finishing end 16*b*, the conductive wire 16 can be easily maneuvered in a connecting process, and the work process can be simplified.

The connection portion 33*a* of each of the phase bus bars 33 is connected to the conductive wire 16 which extends in the axial direction from the coil 4 disposed on an axially lower side of the connection portion 33*a*. Accordingly, while the conductive wire 16 is extended from the coil 4 and connected to the phase bus bar 33, it would never intersect with another conductive wire 16 extended from another coil 4. As a result, the risk of short circuit, which may occur when two conductive wires 16 are in contact with each other, can be reduced. Preferably, the conductive wires do not overlap in the radial direction. More specifically, the phase bus bars 33 do not overlap in a direction from the center axis toward a radially outer side. The six phase bus bars 33 do not overlap with one another in the axial direction. That is, within a span starting from the connection portion 33a over to the terminal portion 33b, the six phase bus bars 33 are not intricately arranged. For this reason, each of the phase bus bars 33 is hindered from approaching one another in the radial direction and also in the axial direction. As a result, the risk of short circuit which may be caused by a contact between the neighboring phase bus bars 33 can be reduced. Further, since the phase bus bars 33 are not overlappingly arranged in the axial direction, the motor 50 can be made compact-sized in the axial direction.

The bus bar holder 30 is a molded article formed of an insulating resin material. The bus bar holder 30 supports the neutral point bus bar 32 and the phase bus bar 33. It is thereby possible to prevent the neutral point bus bar 32 and the phase bus bar 33 from moving due to vibration, and the like. As a result, the occurrence of short circuit which may be caused by a contact between the neutral bus bar 32 and the phase bus bar 33, and a contact between the phase bus bars 33 can be inhibited. The bus bar holder 30 is disposed between the stator 1, and the neutral point bus bar 32 and the phase bus bar 33. With this, it is possible to prevent the neutral point bus bar 32 and the phase bus bar 33 from being short circuited from the coil 4 of the stator 1.

The bus bar holder 30 has a neutral point bus bar support portion 30d. The neutral point bus bar support portion 30d extends in the axial direction from the bus bar holder 30, and supports the relay portion 32b of the neutral point bus bar 32. Each of the neutral point bus bar support portion 30d consists of a pair of protruding pieces which extend in the axial direction. Each of the neutral point bus bar support portion 30d supports the relay portion 32b by having the relay portion inserted between the protruding pieces.

The bus bar holder 30 has a support surface 30a, and a groove portion 30b. The support surface 30a is a surface which faces the direction in which the terminal portion 33b of the phase bus bar 33 is extended (that is, +Z direction). The support surface 30a is in contact with the rear surface 33d of the relay portion 33c disposed to the phase bus bar 33. The support surface 30a supports one end 33e of the terminal portion 33b of the phase bus bar 33 through the relay portion 33c. The bus bar holder 30 supports the phase bus bar 33 from the rear side of the support surface 30a when the terminal portion 33b is inserted to the socket (not illustrated in the drawings) of the control unit.

The groove portion 30b extends in the axial direction. The width of the groove portion 30b is substantially identical to or bigger than the width of the terminal portion 33b. More specifically, the circumferential width of the groove portion 30b is substantially identical to or bigger than the circumferential width of the terminal portion 33b. The terminal portion 33b is received in the groove portion 30b. Since the terminal portion 33b is received inside the groove portion 30b, its movement in the width direction is limited. Accordingly, when the terminal portion 33b is inserted to the control unit, the terminal portion 33b would not move in the width direction, and thereby the insertion can be performed smoothly. The groove portion 30b has an opening toward one side of the terminal portion 33b in the thickness direction. For this reason, in the groove portion 30b, the terminal portion 33b is able to move in its width direction. In order for the terminal portion 33b to move in the thickness direction, the terminal portion 33b and the socket of the insert portion need to be aligned. Here, the terminal portion 33b falls along a tapered surface, which is provided to the socket side for guidance, by elastic deformation which occurs using one end 33e as a support of bending, and is thereby inserted to the groove portion 30b. As a result, the terminal portion 33b is inserted smoothly. Among the six groove portions 30b provided to the bus bar holder 30, the neighboring groove portions 30b extend parallel to each other. Accordingly, even if the terminal portion 33b moves along the opening of the groove portion 30b, the neighboring terminal portions 33b would not contact each other. That is, the groove portion 30b is capable of inhibiting the movement of the terminal portion 33b, and preventing the neighboring terminal portions 33b from being short-circuited.

The bus bar holder 30 is provided with a plurality of protrusion portions 30c which extend radially outward. In this preferred embodiment, four protrusion portions 30c are provided. The housing 5 is provided with a concave portion 5a which engages each of the protrusion portions 30c of the bus bar holder 30 along the circumferential direction. Since the protrusion portion 30c is fitted into the concave portion 5a, the rotational movement of the bus bar holder 30 relative to the housing 5 is limited.

As shown in FIG. 8, the concave portion 5a of the housing 5 is provided with a supporting surface 5b which is orthogonal to the axial direction and faces the bus bar holder 30. The protrusion portion 30c of the bus bar holder 30 is provided with a facing surface 30e which faces the supporting surface 5b. Among the plurality of protrusion portions 30c of the bus bar holder 30, at least one protrusion portion 30c is in contact with the supporting face 5b of the concave portion 5a, along the facing surface 30e. Accordingly, due to the relative movement of the housing 5 and the bus bar holder 30, the axially approaching movement is limited.

In this preferred embodiment, the bus bar holder 30 performs holding by limiting the rotational movement and the axial movement in one direction, however, other methods of holding can also be used. For example, the bus bar holder 30 may perform holding by being coupled to the housing 5 with a screw. Other than being fixed to the housing 5, the bus bar holder 30 may be fixed to the stator 1. The bus bar holder 30 may be fixed to a bearing holder (not illustrated in the drawings) which supports a bearing 53.

In this preferred embodiment, the motor 50 has two coils 4 per coil group 40. The number of coils in the motor is not limited thereto, as long as m (m≥2) coils are provided per coil group. Also, m is a counting number.

Figure 9:
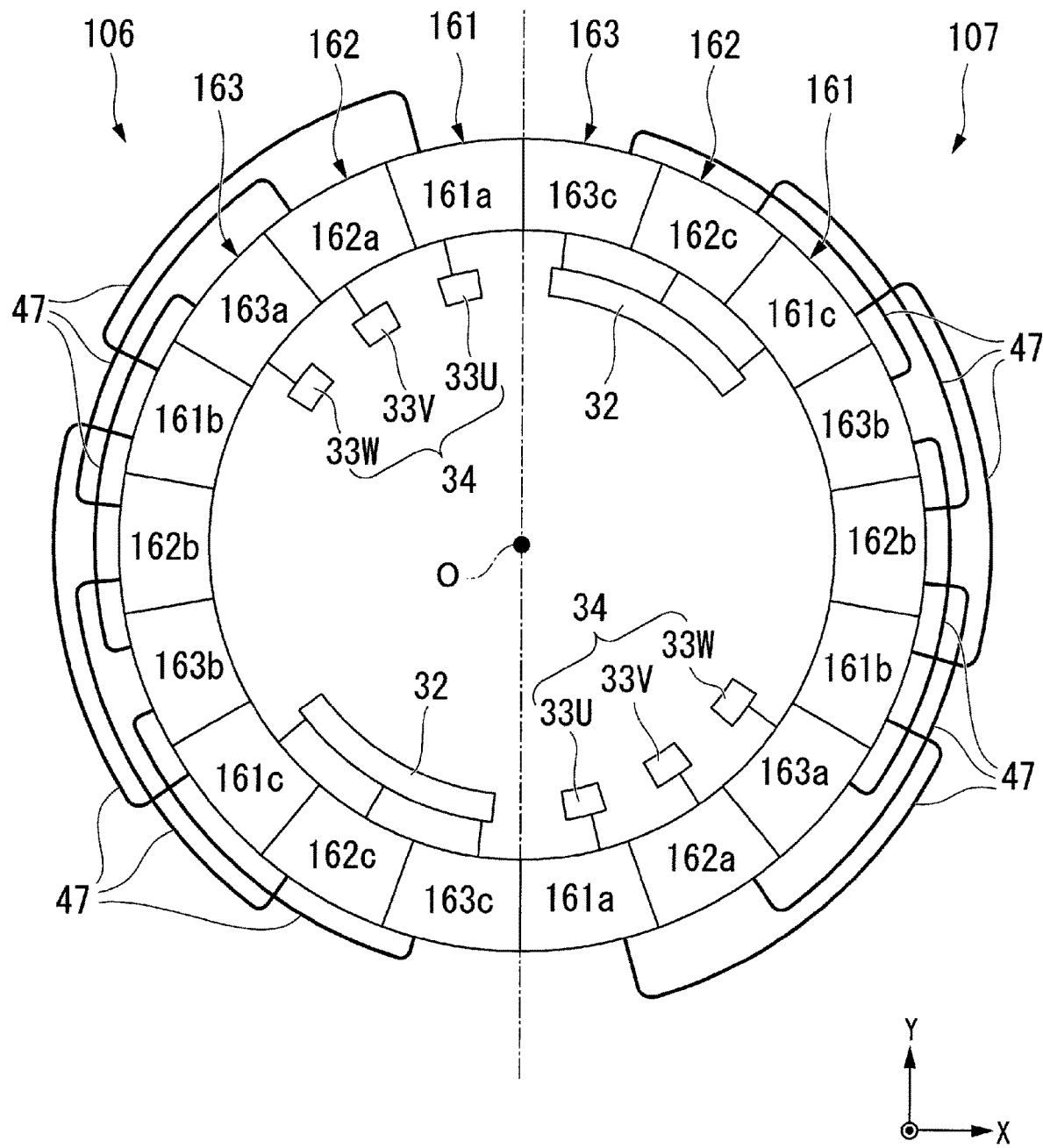
FIG. 9 is a mimetic illustration which views a stator which is employable to a motor according to a first preferred modification in an axial direction.

FIG. 9 illustrates a first preferred exemplary modification of the present disclosure. In the first preferred modification, a motor has a stator 101 in which three coils are provided per coil group. The stator 101 has two sets of three-phase circuits 106, 107. Each phase of the three-phase circuits 106, 107 respectively has a corresponding coil group 161, 162, 163. The U-phase coil group 161 has three coils 161a, 161b, 161c. The V-phase coil group 162 has three coils 162a, 162b, 162c. The W-phase coil group 163 has three coils 163a, 163b, 163c. In the coil group of each phase, each of the coils is formed by a single conductive wire wired in series through a connection wire 47. In each coil group, the coils 161c, 162c, and a terminal of the coil on the coil 163c side are connected to the neutral bus bar 32. In each coil group, the terminals of the coils on the coils 161a, 162a, 163a side are respectively connected to the phase bus bars 33U, 33V, 33W. The phase bus bars 33U, 33V, 33W are respectively arranged in the circumferential direction and form a phase bus bar group 34. The phase bus bar group 34 and the neutral point bus bar 32 are alternately arranged in the circumferential direction. Even when the motor has three coils per coil group as described in the first modification, the structure is identical as the motor 50 described in the foregoing embodiment. Likewise, four or more coils may be provided per coil group.

The motor 50 has two sets of three-phase circuits (the first three-phase circuit 6 and the second three-phase circuit 7). However, the number of three-phase circuits provided to the motor is not limited thereto, as long as the motor has n (n≥2) sets of three-phase circuits.

Figure 10:
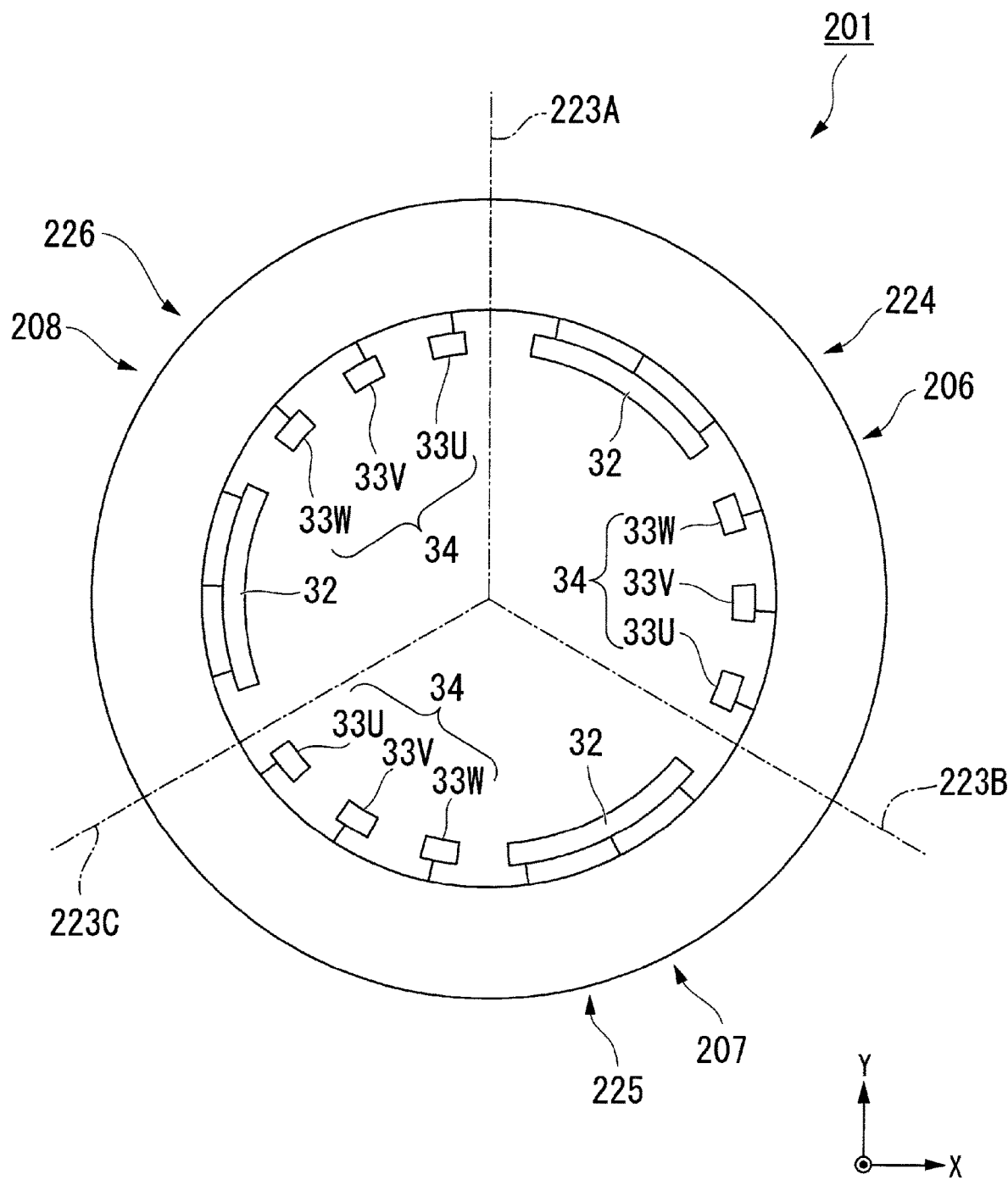
FIG. 10 is a mimetic illustration which views a stator which is employable to a motor according to a second preferred modification in an axial direction.

FIG. 10 illustrates a second preferred exemplary modification of the present disclosure. In the second preferred modification, a motor has a stator 201 which is provided with three sets of three-phase circuits 206, 207, 208. As shown in FIG. 10, when viewed in the axial direction, the stator 201 can be divided into a first area 224, a second area 225, and a third area by hypothetical trisecting lines 223A, 223B, 223C. Herein, the first three-phase circuit 206 is arranged in the first area 224, the second three-phase circuit 207 is arranged in the second area 225, and the third three-phase circuit 208 is arranged in the third area 226. The phase bus bar group 34 and the neutral point bus bar 32 are alternately arranged in the circumferential direction.

In the stator 201, the phase bus bars 33 of the same phase from the three different three-phase circuits (that is, the first three-phase circuit 206, the second three-phase circuit 207, and the third three-phase circuit 208) are arranged in the circumferential direction at every angle obtained by the $360°/n$ formula. In the second modification, n=3. With this formula, in the second preferred modification, the three different three-phase circuits are provided every 120° in the circumferential direction of the stator 201. By arranging the phase bus bars of the same phase this way, the winding direction and the winding order direction of all coil groups 40 are set in the same direction.

The stator 201 has three sets of three-phase circuits 206, 207, 208 which are independent of one another. With this structure, the motor is provided with a plurality of current pathways, and even if defect occurs in one current pathway of one set of the three-phase circuit, the motor can be activated with the two remaining sets of the three-phase circuits by reducing the output to ⅓. Accordingly, even when the motor is provided with three sets of three-phase circuits, the structure is the same as the motor 50 described in the foregoing embodiment. Further, the motor may have four or more sets of three-phase circuits.

In the foregoing preferred embodiments, the phase bus bar 33 and the neutral point bus bar 32 are supported by the bus bar holder 30. However, the motor 50 may not be provided with a bus bar holder. The bus bar holder 30 may be formed by insert molding a portion of the phase bus bar 33 and a portion of the neutral point bus bar 32.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A motor, comprising:
a stator including a plurality of coils arranged in an annular shape, and
a rotating shaft extending on a rotary axis which penetrates the stator, wherein
the stator includes two sets of three-phase circuits defined by the plurality of coils, each of which is provided with three phases,
the two sets of three-phase circuits are respectively connected to: (i) neutral point bus bars and (ii) three phase bus bars that include bus bar terminals which provide paths for current to flow through to each of three phases of the motor,
the three phase bus bars are arranged in a circumferential direction of the stator of the stator and define phase bus bar groups,
none of the bus bar terminals included in the three phase bus bars overlap one another in a radial direction of the stator,
the three phase bus bars are arranged 180 degrees apart from one another in the circumferential direction, and
the neutral point bus bars are arranged at 180 degrees apart from one another in the circumferential direction.
2. The motor according to claim 1, wherein
the three phase bus bars in the phase bus bar groups each include:
a connection portion which is connected to a conductive wire which extends in an axial direction along the rotary axis from one end of one of the plurality of coils,
a terminal portion which includes a terminal connected to a controller which supplies an alternating current to the three-phase circuits, and
a relay portion which connects the connection portion and the terminal portion, wherein
the relay portion is in contact with the stator, and
the connecting portion is spaced apart from the stator.
3. The motor according to claim 2, wherein
the terminal portion extends from the connection portion in an axial direction along the rotary axis, and
the phase bus bars do not overlap with one another in the radial direction.
4. The motor according to claim 3, wherein
the bus bar holder includes a support surface, and
the support surface is in contact with an axially lower surface of the relay portion and a radially outer surface of the terminal portion.
5. The motor according to claim 2, wherein
the terminal portion extends from the connection portion in an axial direction along the rotary axis, and
the phase bus bars do not overlap with one another in the axial direction.
6. The motor according to claim 2, wherein
in the two sets of three-phase circuits, each phase is star-connected at a neutral point.
7. The motor according to claim 6, wherein
the three-phase circuits include:
neutral point bus bars which connect each coil terminal on one side of each of coil groups of the plurality of coils at a neutral point, and
the three phase bus bars which connect each coil terminal on one side of each of the coil groups, and
the motor includes a bus bar holder which supports the neutral point bus bars and the phase bus bars.
8. The motor according to claim 7,
wherein the bus bar holders include a supporting surface which supports one end of the terminal portion of the phase bus bars, and a groove portion which extends in the axial direction and receives the terminal portion.

9. The motor according to claim 7,
wherein the motor further comprises a housing which surrounds the stator,
the bus bar holder includes a protrusion portion which extends radially outward from the stator, and
the housing includes a concave portion where the protrusion portion is fitted into so that the protrusion portion contacts the concave portion on one side in the axial direction.

10. The motor according to claim 2,
wherein a boundary between the relay portion and the connection portion is bent.

11. The motor according to claim 2,
wherein a boundary between the relay portion and the terminal portion is bent.

12. The motor according to claim 2, wherein
the terminal portion is located radially outside the connection portion, and
the connecting portion is connected to one end of the one of the plurality of coils axially above the one of the plurality of coils.

13. The motor according to claim 1,
wherein the phase bus bars are respectively connected to winding beginning sides of conductive wires of the sets of three-phase groups.

14. The motor according to claim 1, wherein
each of the three phase bus bars includes a connection portion, a terminal portion, and a relay portion;
two different ones of the connection portions are arranged 180 degrees apart from one another in the circumferential direction;
two different ones of the terminal portions are arranged 180 degrees apart from one another in the circumferential direction; and
two different ones of the relay portions are arranged 180 degrees apart from one another in the circumferential direction.

* * * * *